United States Patent
Lu

(10) Patent No.: US 9,627,728 B2
(45) Date of Patent: Apr. 18, 2017

(54) RECHARGEABLE ANION BATTERY CELL USING A MOLTEN SALT ELECTROLYTE

(71) Applicant: SIEMENS AKTIENGESELLSCHAFT, Munich (DE)

(72) Inventor: Chun Lu, Breinigsville, PA (US)

(73) Assignee: SIEMENS AKTIENGESELLSCHAFT, München (DE)

( * ) Notice: Subject to any disclaimer, the term of this patent is extended or adjusted under 35 U.S.C. 154(b) by 0 days.

(21) Appl. No.: 14/349,834

(22) PCT Filed: Nov. 2, 2012

(86) PCT No.: PCT/US2012/063296
§ 371 (c)(1),
(2) Date: Apr. 4, 2014

(87) PCT Pub. No.: WO2013/067333
PCT Pub. Date: May 10, 2013

(65) Prior Publication Data
US 2014/0295295 A1 Oct. 2, 2014

Related U.S. Application Data

(63) Continuation-in-part of application No. 13/289,374, filed on Nov. 4, 2011, now abandoned.

(51) Int. Cl.
*H01M 12/08* (2006.01)
*H01M 8/14* (2006.01)
*H01M 12/06* (2006.01)
*H01M 8/0295* (2016.01)
*H01M 10/39* (2006.01)

(52) U.S. Cl.
CPC .......... *H01M 12/08* (2013.01); *H01M 8/0295* (2013.01); *H01M 8/145* (2013.01); *H01M 10/399* (2013.01); *H01M 12/06* (2013.01); *H01M 2300/0051* (2013.01)

(58) Field of Classification Search
CPC .......... H01M 12/08; H01M 2008/147; H01M 10/399; H01M 2300/0051; H01M 8/0295; H01M 8/145; H01M 12/06
USPC ........................ 429/16, 403, 405, 464, 472
See application file for complete search history.

(56) References Cited

U.S. PATENT DOCUMENTS

| | | |
|---|---|---|
| 4,480,017 A | 10/1984 | Takeuchi et al. |
| 4,581,303 A | 4/1986 | Pasco et al. |
| 4,895,774 A | 1/1990 | Ohzu et al. |
| 5,213,908 A | 5/1993 | Hagedorn |

(Continued)

FOREIGN PATENT DOCUMENTS

WO    2011019455 A1    2/2011

*Primary Examiner* — James Lee

(57) ABSTRACT

A rechargeable electrochemical battery cell includes a molten carbonate salt electrolyte whose anion transports oxygen between a metal electrode and an air electrode on opposite sides of the electrolyte, where the molten salt electrolyte is retained inside voids of a porous electrolyte supporting structure sandwiched by the electrodes, and the molten salt includes carbonate including at least one of the alkaline carbonate including $Li_2Co_2$, $NA_2CO_2$, and $K_2CO_2$, having a melting point between 400° C. and 800° C.

10 Claims, 3 Drawing Sheets

OVERALL REACTION: $y/2O_2 + xMe \Leftrightarrow Me_xO_y$

(56) References Cited

U.S. PATENT DOCUMENTS

| | | |
|---|---|---|
| 6,399,247 B1 | 6/2002 | Kitayama et al. |
| 7,396,612 B2 | 7/2008 | Ohata et al. |
| 2011/0033769 A1 | 2/2011 | Huang et al. |
| 2011/0177422 A1* | 7/2011 | Wolk .................. H01M 4/8605 429/478 |
| 2011/0256448 A1 | 10/2011 | Huang et al. |

* cited by examiner

REACTION PATH 1: $Me + xO^{2-} \Longleftrightarrow MeO_x + 2xe^-$

REACTION PATH 2: $xO^{2-} \Longleftrightarrow x/2 O_{2(g)} + 2xe^-$
$x/2 O_{2(g)} + Me \Longleftrightarrow MeO_x$ $x/2 O_{2(g)} + 2xe^- \Longleftrightarrow xO^{2-}$ OVERALL REACTION: $y/2 O_2 + xMe \Leftrightarrow Me_xO_y$

RECHARGEABLE ANION BATTERY CELL USING A MOLTEN SALT ELECTROLYTE

CROSS REFERENCE TO RELATED APPLICATIONS

This application is the US National Stage of International Application No. PCT/US2012/063296 filed Nov. 2, 2012 and claims benefit thereof, the entire content of which is hereby incorporated herein by reference. The International Application claims priority to the U.S. application Ser. No. 13/289,374 US filed Nov. 4, 2011, the entire contents of which is hereby incorporated herein by reference.

BACKGROUND OF THE INVENTION

Field of the Invention

This present invention relates to a rechargeable electrochemical anion battery cell, which uses a molten salt electrolyte, preferably containing carbonate ion ($CO_3^{2-}$).

Related Art

Electrical energy storage is crucial for the effective proliferation of an electrical economy and for the implementation of many renewable energy technologies. During the past two decades, the demand for the storage of electrical energy has increased significantly in the areas of portable, transportation, and load-leveling and central backup applications.

The present electrochemical energy storage systems are simply too costly to penetrate major new markets, still higher performance is required, and environmentally acceptable materials are preferred. Transformational changes in electrical energy storage science and technology are in great demand to allow higher and faster energy storage at the lower cost and longer lifetime necessary for major market enlargement. Most of these changes require new materials and/or innovative concepts with demonstration of larger redox capacities that react more rapidly and reversibly with cations and/or anions.

Batteries range in size from button cells used in watches, to megawatt loading leveling applications. They are, in general, efficient storage devices, with output energy typically exceeding 90% of input energy, except at the highest power densities. Rechargeable batteries have evolved over the years from lead-acid through nickel-cadmium and nickel-metal hydride ("NiMH") to lithium-ion batteries. NiMH batteries taught, for example, in U.S. Pat. No. 6,399,247 B1 (Kitayama), were the initial workhorse for electronic devices such as computers and cell phones, but they have almost been completely displaced from that market by lithium-ion batteries, taught for example by U.S. Pat. No. 7,396,612 B2 (T. Ohata et al.) because of the latter's higher energy storage capacity. Today, NiMH technology is the principal battery used in hybrid electric vehicles, but it is likely to be displaced by the higher power energy and now lower cost lithium-ion batteries, if the latter's safety and lifetime can be improved. Of the advanced batteries, lithium-ion is the dominant power source for most rechargeable electronic devices.

What is needed is a dramatically new electrical energy storage device that can easily discharge and charge a high capacity of energy quickly and reversibly, as needed. What is also needed is a device that is simple and that can operate for years without major maintenance. It is a main object to provide a new and improved electrochemical battery that is easy to charge and discharge and has low maintenance. One possibility is a rechargeable oxide-ion battery (ROB) set out in U.S. Application Publication No. U.S. 2011/0033769A1 (Huang et al.) and U.S. application Ser. No. 12/850,086 (Huang et al.), filed on Aug. 4, 2010. A ROB comprises a metal electrode, an oxide-ion conductive electrolyte, and a cathode. The metal electrode undergoes reduction-oxidation cycles during charge and discharge processes for energy storage. For example, in discharging mode, the metal is oxidized: $yMe+x/2O_2=Me_yO_x$ and is reduced in charging mode: $Me_yO_x=yMe+x/2O_2$, where Me=metal.

Molten carbonate fuel cells ("MCFC") are well known in the art and convert chemical energy into direct current electrical energy, typically at temperatures above about 450° C. This temperature is required to melt carbonate and render electrolyte sufficiently conductive. Alkaline carbonate is a prime electrolyte. Such fuel cells are taught, for example, by U.S. Pat. Nos. 4,895,774 and 4,480,017 (Ozhu et al. and Takeuchi et al, respectively). The general working principles and general reactions of a MCFC are shown in prior art FIG. 1, where anode 12, electrolyte 14, cathode 16 and load 18 are shown, along with the electrochemical reactions. Here, carbon dioxide ($CO_2$) and oxygen (in air, for example) are reduced into carbonate ion ($CO_3^{2-}$) by the reaction: $CO_2+1/2O_2+2e^-=CO_3^{2-}$. The $CO_3^{2-}$ migrates to a fuel electrode, anode 12, through a molten carbonate electrolyte 14, and reacts with provided fuel (that is, $H_2$), by the reaction $CO_3^{2-}+H_2 \rightarrow H_2O+CO_2$. Therefore, the overall reaction is $H_2+1/2O_2=H_2O$.

Although a MCFC is able to convert chemical energy of fuel into electrical energy, operated in the temperature range of between 500° C. and 700° C., it is incapable of storing energy by converting electrical energy into chemical energy. Therefore, there is a need to design a rechargeable battery based on carbonate ion for energy storage. This invention describes a rechargeable battery cell in which $CO_3^{2-}$ is used as a shuttle media to reversibly transport electronic charges between negative and positive electrodes. In addition, the configurations and materials employed in such a battery are also depicted.

SUMMARY OF THE INVENTION

The above needs are met and object accomplished by providing rechargeable anion battery cells, using a molten salt electrolyte whose anion transports $CO_3^{2-}$ between a metal electrode and an air electrode on opposite sides of the molten salt electrolyte. The carbonate ion ($CO_3^{2-}$) in a molten state is transferred between electrodes on either side of the electrolyte, with the overall reaction of $y/2O_2+xMe \leftrightarrows Me_xO_y$, where Me=metal.

This is provided by an electrochemical battery cell which comprises an air electrode where reduction-oxidation reaction between oxygen and carbonate ion takes place; a metal electrode where a carbonate ion interacts with metal for releasing/capturing oxygen during discharging/charging operation, respectively; and a molten salt electrolyte disposed between the said air electrode and metal electrode, and including a porous retaining material structured for accommodating the molten salt, where the overall reaction is $y/2O_2+xMe \leftrightarrows Me_xO_y$, where y=1 to 5 and x=1 to 4.

BRIEF DESCRIPTION OF THE DRAWINGS

For a better understanding of the invention, reference may be made to the preferred embodiments exemplary of this invention, shown in the accompanying drawings in which.

DESCRIPTION OF THE PREFERRED EMBODIMENT

Figure 1:
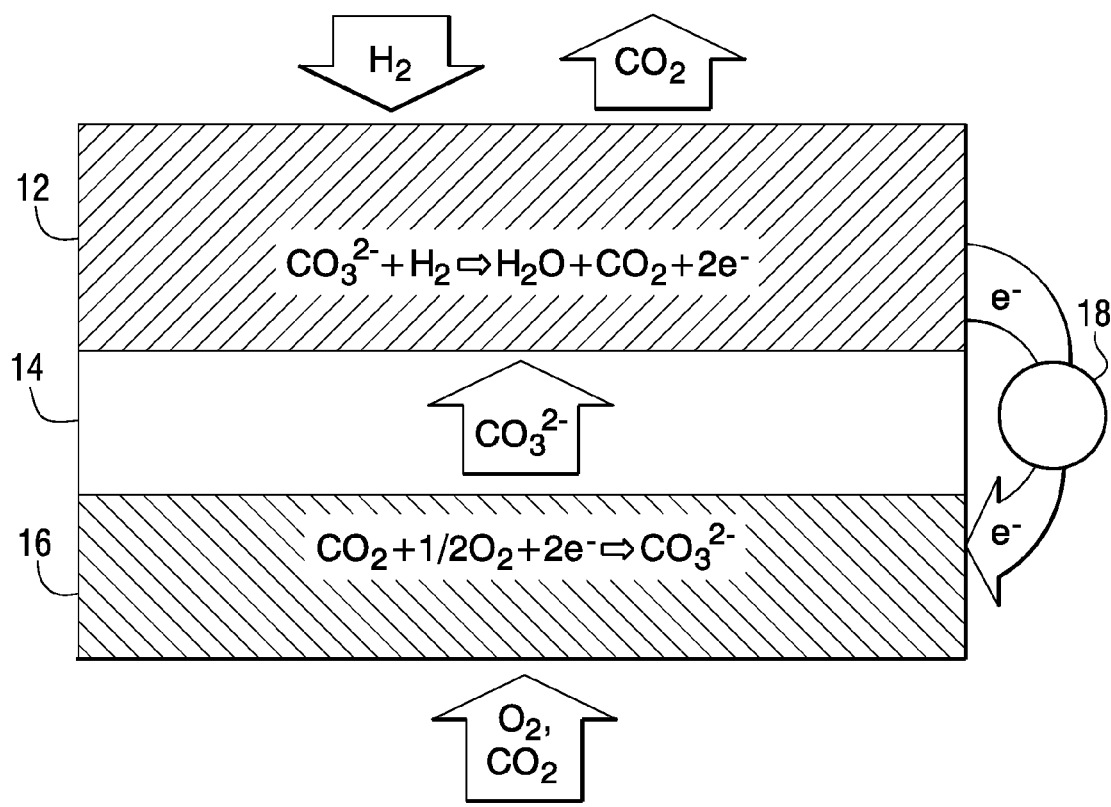
FIG. 1 illustrates the operation principles, generally, of prior art molten carbonate fuel cells.
Figure 2:
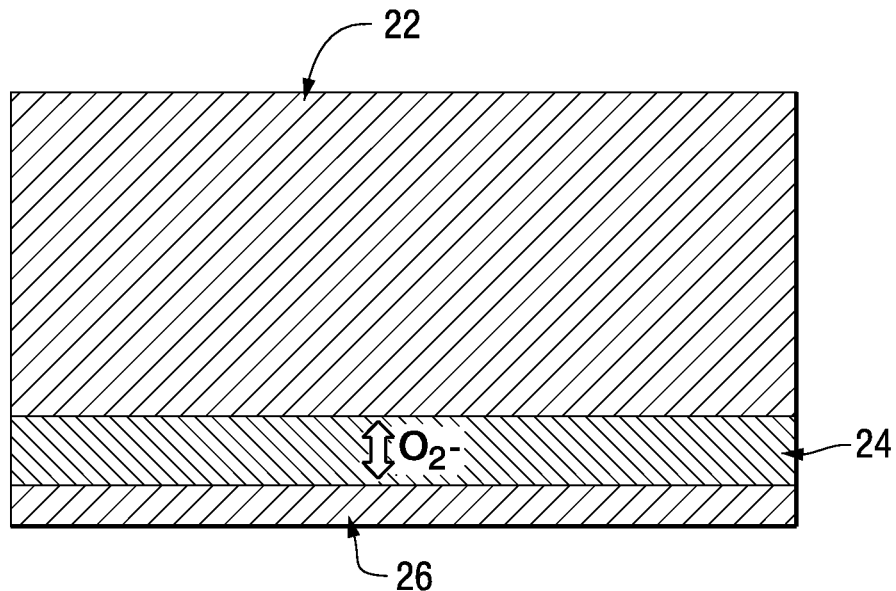
FIG. 2 illustrates the working principles of a rechargeable oxide-ion battery (ROB) cell.

The working principles of a rechargeable oxide-ion battery (ROB) cell are schematically shown in FIG. 2, where metal electrode (anode) 22, electrolyte 24 and air electrode (cathode) 26 are shown. In discharge mode, oxide-ion anions migrate from the high partial pressure oxygen side (air electrode 26) to the low partial pressure oxygen side (metal electrode 22) under the driving force of gradient of oxygen chemical potential. There exist two possible reaction mechanisms to oxidize the metal. One of them, as designated as Path 1, is that oxide ion can directly electrochemically oxidize metal to form a metal oxide. The other, as designated as Path 2, involves generation and consumption of gaseous phase oxygen. The oxide ion can be initially converted to gaseous oxygen molecules on the metal electrode, and then further reacted with metal via a solid-gas phase mechanism to form metal oxide. In charge mode, the oxygen species, released by reducing metal oxide to metal via electrochemical Path 1 or solid-gas mechanism Path 2, are transported from the metal electrode back to the air electrode.

Figure 3:
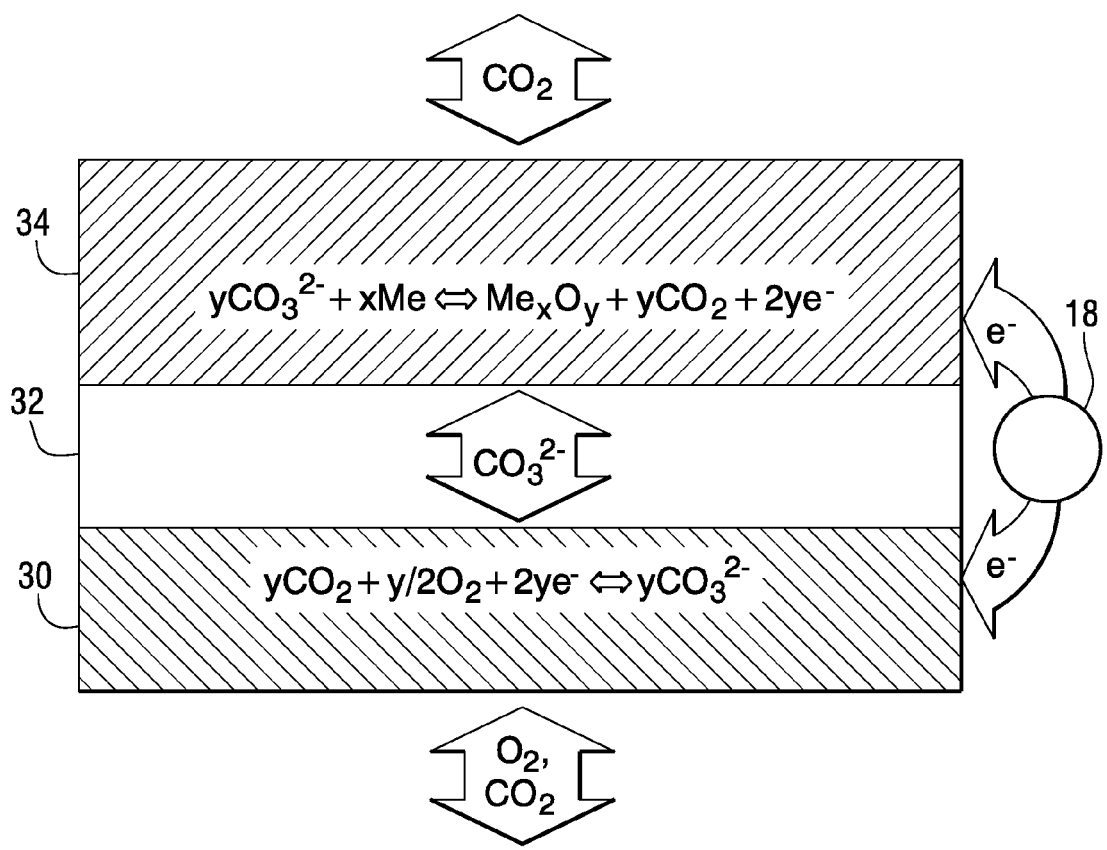
FIG. 3 is a schematic illustration of the electrochemical battery of this invention, using molten salt electrolyte.

FIG. 3 illustrates the operational principles of the invented electrochemical battery of this invention based on $CO_3^{2-}$ ion, consisting of an air electrode 30, molten salt electrolyte 32, and a metal electrode 34, with interaction of metal electrode $\leftrightarrows CO_2$, and air electrode 30 with $O_2$, $CO_2$ exit entry. Retained inside voids of a porous electrolyte supporting structure, which is sandwiched by the electrodes 30 and 34, the molten salt 32 comprises carbonate mixture of $Li_2CO_3$ and at least one alkaline carbonate selected from the group consisting of $Na_2CO_3$ and $K_2CO_3$. These alkaline carbonates, as electrolyte, have a melting point between 400° C. and 800° C. In discharging mode, the $CO_3^{2-}$ ion, generated by the reduction reaction of $yCO_2+y/2O_2+2ye^- \rightarrow yCO_3^{2-}$ on the air electrode where y=1-5, diffuses through molten salt and reaches the metal electrode where it oxidizes metal of the metal electrode following the reaction of $yCO_3^{2-}+xMe \rightarrow Me_xO_y+yCO_2+2ye^-$, where Me=a metal of the metal electrode selected from the group consisting of Sc, Y, La, Ti, Zr, Hf, Ce, Cr, Mn, Fe, Co, Ni, Cu, Nb, Ta, V, Mo, Pd and W and where y=1-5 and x=1-4.

The total discharging reaction of the invention is expressed as $y/2O_2+xMe \rightarrow Me_xO_y$. In the charging mode, the metal oxide is reduced back into metal, by the reaction $Me_xO_y \rightarrow y/2O_2+xMe$. On the metal electrode, the metal oxide is reduced following the reaction of $Me_xO_y+yCO_2+2ye^- \rightarrow yCO_3^{2-}+xMe$. The produced $CO_3^{2-}$ ion reverses back to the air electrode and forms $CO_2$ and $O_2$ by the reaction of $yCO_3^{2-} \rightarrow yCO_2+y/2O_2+2ye^-$. A discharging-charging cycle essentially is the metal oxidation and reduction reaction of $y/2O_2+xMe \leftrightarrows Me_xO_y$, which is utilized for releasing and capturing electrical charges for energy storage, respectively.

In the invention, the anion of a molten salt ($CO_3^{2-}$) is a carrier for transporting oxygen between the electrodes. The preferred molten salt is an alkali carbonate mixture of ($Li_2CO_3$) and at least one material selected from the group consisting of sodium carbonate ($Na_2CO_3$), and potassium carbonate ($K_2CO_3$). These alkali carbonate mixtures can preferably be transformed producing an eutectic molten salt when its composition ratio is constituted by about 62 mol % of $Li_2CO_3$ and about 38 mol % of $K_2CO_3$. The electrolyte is contained in a porous retaining material preferably selected from the group consisting of lithium aluminate, lithium zirconate and stabilized zirconia.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. A rechargeable battery cell comprising:
   an air electrode;
   a metal electrode;
   a molten salt electrolyte disposed between the air electrode and metal electrode and including a porous retaining material structured for accommodating a carbonate ion in a molten salt state,
   wherein at the air electrode a reduction-oxidation reaction between oxygen and the carbonate ion takes place, and
   wherein at the metal electrode, the carbonate ion interacts with metal for releasing/capturing oxygen during discharging/charging operation, respectively.

2. The rechargeable battery cell as claimed in claim 1, wherein an anion of the molten salt is a carrier for transporting oxygen between the air electrode and the metal electrode.

3. The rechargeable battery cell as claimed in claim 1, wherein the molten salt electrolyte comprises an alkali carbonate mixture of lithium carbonate ($Li_2CO_3$) and at least one material selected from the group consisting of sodium carbonate ($Na_2CO_3$), and potassium carbonate ($K_2CO_3$).

4. The rechargeable battery cell as claimed in claim 3, wherein the alkali carbonate mixture has a melting point between 400° C. and 800° C.

5. The rechargeable battery cell as claimed in claim 4, wherein the molten salt electrolyte consists essentially of lithium carbonate ($Li_2CO_3$) and potassium carbonate ($K_2CO_3$).

6. The rechargeable battery cell as claimed in claim 5, wherein the alkali carbonate mixture is transformed producing an eutectic molten salt when its composition ratio is constituted by 62 mol % of lithium carbonate ($Li_2CO_3$) and 38 mol % of potassium carbonate ($K_2CO_3$).

7. The rechargeable battery cell as claimed in claim 1, wherein the porous retaining material for the molten salt electrolyte is made of at least one material selected from the group consisting of lithium aluminate, lithium zirconate and stabilized zirconia.

8. The rechargeable battery cell as claimed in claim 1, wherein the metal of the metal electrode is selected from the group consisting of Sc, Y, La, Ti, Zr, Hf, Ce, Cr, Mn, Fe, Co, Ni, Cu, Nb, Ta, V, Mo, Pd and W.

9. The rechargeable battery cell as claimed in claim 1, wherein the reaction at the metal electrode is $yCO_3^{2-}+xMe \leftrightarrows Me_xO_y+yCO_2+2ye^-$, wherein y=1-5 and x=1-4.

10. The rechargeable battery cell as claimed in claim 1, wherein the reaction at the air electrode is $yCO_2+y/2O_2+2ye^- \leftrightarrows yCO_3^{2-}$, wherein y=1-5.

* * * * *